No. 765,109. PATENTED JULY 12, 1904.
F. STICKER.
HOSE COUPLING.
APPLICATION FILED JAN. 29, 1903.
NO MODEL. 2 SHEETS—SHEET 2.
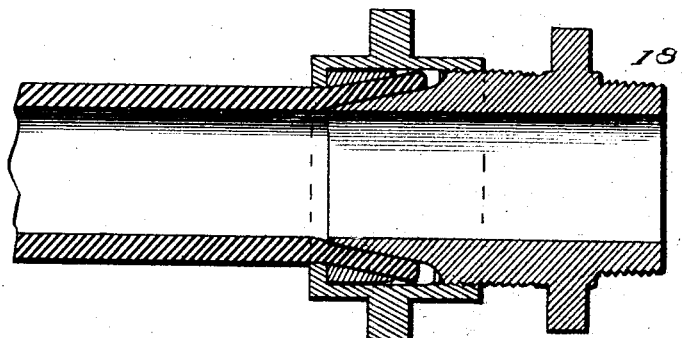
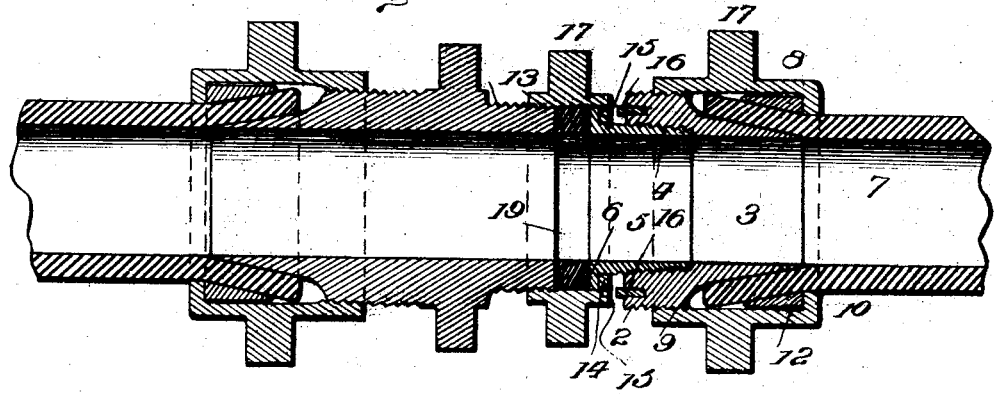

No. 765,109. Patented July 12, 1904.

UNITED STATES PATENT OFFICE.

FRANCIS STICKER, OF NEW YORK, N. Y., ASSIGNOR OF ONE-HALF TO CHARLES A. DRUCKLIEB, OF NEW YORK, N. Y.

HOSE-COUPLING.

SPECIFICATION forming part of Letters Patent No. 765,109, dated July 12, 1904.

Application filed January 29, 1903. Serial No. 141,060. (No model.)

*To all whom it may concern:*

Be it known that I, FRANCIS STICKER, of New York, in the county of New York and State of New York, have invented certain new and useful Improvements in Hose-Couplings; and I do hereby declare the following to be a full, clear, and exact description of the invention, such as will enable others skilled in the art to which it appertains to make and use the same.

The object of this invention is to provide an improved hose-coupling having effective means for insuring the hose being properly held and danger of leakage avoided, the coupling being applicable for securing the hose directly to a plug or hydrant, as well as for the splicing together of hose-sections and for fastening a nozzle to the end of a hose.

The invention will be hereinafter fully set forth, and particularly pointed out in the claims.

Figure 1:
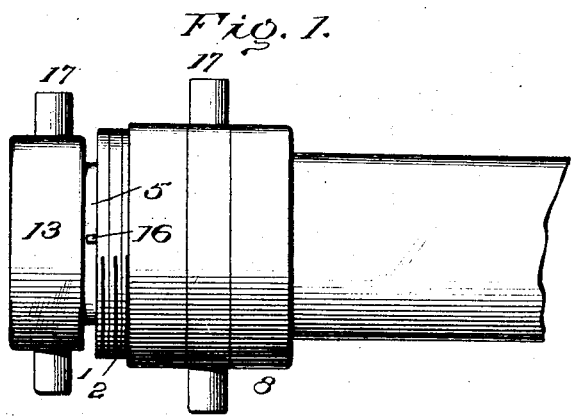
Figure 2:
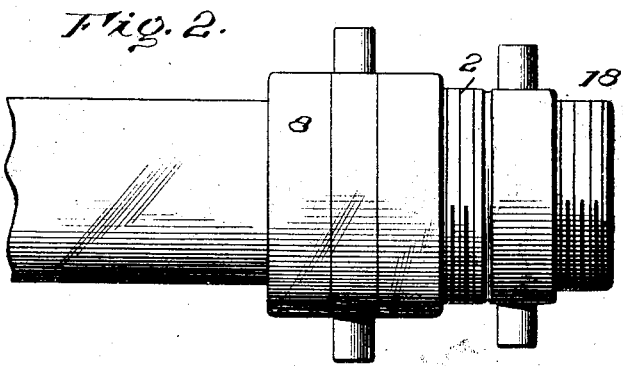
Figure 3:
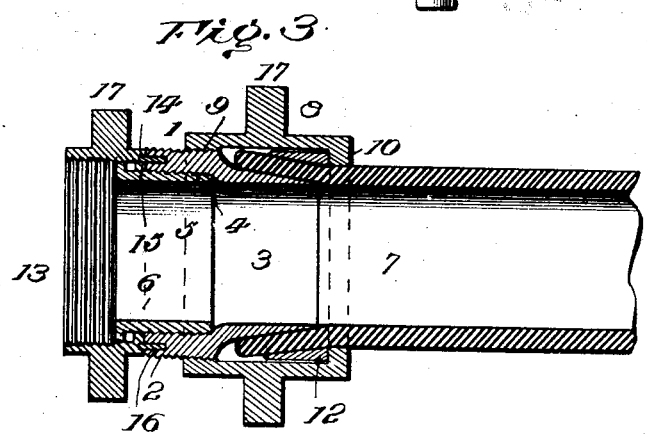

In the accompanying drawings, Figure 1 is a view in side elevation of the form used for plug connections. Fig. 2 is a similar view of the form for nozzle connection. Fig. 3 is a longitudinal sectional view of Fig. 1. Fig. 4 is a similar view of Fig. 2. Fig. 5 shows in longitudinal section the two forms secured together, as in splicing hose-sections.

I will first describe the coupling as employed for plug or hydrant connections.

Referring to the drawings, 1 designates a coupling-sleeve having an exterior thread 2 and at one end, extending from the threaded portion, a projection 3, the outer surface of which is tapered or cone-like, its inner surface being uniformly parallel with the axis of the cylindrical sleeve. The two surfaces terminate in a sharp edge, causing the bore to correspond with and lie in the plane of the bore of the tubing. At its other end the sleeve is counterbored and formed with a female thread 4, with which engages a tailpiece 5, exteriorly threaded and having its outer end formed with a flange 6, the bore of the tailpiece being the same as that of the sleeve. The tapered projection 3 is designed to extend into the end of a hose 7, which latter is expanded as it and the projection are telescoped.

8 designates a nut internally threaded at 9 to engage the thread 2 of sleeve 1, such nut having at its outer end an inwardly-extended annular shoulder 10. This shoulder is designed to engage a locking or binding ring 12, which encircles the end of the hose and serves to bind the latter tight against the tapered projection. The ring has a tapered bore, the taper thereof conforming to that of the projection 3, so that the hose is bound on the latter with wedge-like action, but without injury to the flexible material. As the nut is screwed home its shoulder engages the outer edge of the ring and forces the latter inwardly over the end of the hose, and the more the nut is tightened the tighter the joint, since the ring is free to be moved by the nut until a perfect jointure is secured. The external diameter of ring 12 is slightly less than the internal diameter of the nut. The ring is triangular in cross-section and of greater width than thickness. It is made of soft metal, preferably brass, permitting of slight expansion. Thus when nut 10 engages the ring it is practically working against the width of the ring, resulting in the latter being pushed over the tubing and by frictional engagement moving the tubing well over the tapered projection; but while the tubing is being forced along the tapered sleeve it is in conforming to the wedge, so to speak, pressing against the broad face of the ring—that is, against its thickness—which expands slightly under the pressure. The nut may thus be moved until the expansion of the ring has caused the latter to fill the space between itself and the nut, at the same time conforming to any irregularities in the surface of the tubing and insuring a perfect joint. If the width of the nut were less than that shown or practically the same as the thickness, the expansion could not result, as the ring would offer the same resistance in either direction and the tightening of the nut would either turn the ring or force it out of shape. In screwing home the nut the hose is not twisted, as the nut turns around the shoulder formed by the end of the ring and is thereby prevented from materially contacting with the hose.

13 designates a coupling-nut loose on tailpiece 5 and having an inner stop-flange 14. This nut is formed with a female thread for securing the coupling to a plug or hydrant or anything equipped with a male thread. For the purpose of locking the nut and the tapered sleeve together while the hose is being secured on the latter I form the nut with holes 15 and the sleeve with lugs 16. After the hose is secured the nut is released from engagement with the lugs and can then be revolved freely on the tailpiece to couple to anything desired. The ring-binding nut 8 and the coupling-nut 13 are equipped with laterally-projecting lugs 17, by which they may be easily and readily revolved.

The male construction (shown in Figs. 2 and 4) differs from the construction hereinbefore described and shown in Figs. 1 and 3 in that the coupling-sleeve is elongated and formed with a second male thread 18 to accommodate a nozzle or form connection through the coupling-nut with the female coupling, as shown in Fig. 5. When the parts are so coupled together, as in splicing, a packing-ring 19 is fitted between the tailpiece 5 and the sleeve of the male coupling. (See Fig. 5.)

The advantages of my invention are apparent to those skilled in the art. It will be noted that a perfectly smooth bore is presented at the points of jointure of the hose and the couplings and also between the two couplings, thus avoiding all danger of undue wear by internal friction. The hose-sections do not have to be specially formed, as with external shoulders, to check the progress of the binding-ring, the latter being arrested only by the binding of the hose over the tapered member extended thereinto, the tight fit of the ring upon the hose being insured by the provision for expansion. My improvements, as herein described, are applicable for both male and female connections, and the two forms may themselves be connected in splicing hose-sections. In all forms the hose-sections may be readily fastened to the couplings without twisting them in the direction of their length.

I claim as my invention—

1. In a coupling for flexible tubing, a sleeve externally threaded at one end and provided at the other end with a tapered projection designed to enter the tubing, a nut encircling the end of such tubing and engaging the thread of the sleeve and having an internal shoulder at its outer end, and an expansible ring of greater width than thickness, encompassing said tubing and having a tapered bore corresponding to said tapered projection, normally of slightly less external diameter than the internal diameter of said nut, by which latter it is accommodated, substantially as and for the purpose set forth.

2. In a coupling for flexible tubing, a sleeve externally threaded at one end and provided at the other end with a projection whose outer surface is tapered or cone-like and whose inner surface or bore is uniform, said taper and bore terminating in a sharp edge, said projection being designed to enter the tubing, a nut encircling the end of such tubing and engaging the thread of the sleeve and having an internal shoulder at its outer end, and an expansible ring of greater width than thickness, encompassing said tubing and having a tapered bore corresponding to said tapered projection, normally of slightly less external diameter than the internal diameter of said nut, by which latter it is accommodated, substantially as and for the purpose set forth.

3. The herein-described coupling between hose-sections comprising two sleeves, each threaded on its outer surface and having projections designed to extend into the ends of hose-sections, such projections having their outer surfaces tapered or cone-like and their inner surfaces or bores uniform, such tapers and bores terminating in sharp edges, expansible rings encircling the hose ends, such rings having tapered bores conforming to the tapers of said projections, nuts working on said sleeves designed to engage said rings, said rings being normally of slightly less external diameter than the internal diameter of said nuts, one of said sleeves having a tailpiece extending therefrom, a coupling-nut loose on said tailpiece, and means for temporarily locking said coupling-nut to said latter sleeve, said coupling-nut being interiorly threaded to engage the exterior thread of the other sleeve, the bores of said sleeves and tailpiece being uniform with each other and that of the tubing, substantially as and for the purpose set forth.

4. A hose-coupling comprising a sleeve having a male thread, a tapered projection designed to extend into the end of a hose-section, said sleeve also having a female thread, a tailpiece engaging said female thread, a ring encompassing that portion of the hose on said tapered projection, a nut for engaging the male thread of said sleeve and binding said ring against the hose, a coupling-nut loose on said tailpiece having an interior thread, and means for locking the coupling-nut and sleeve together while the hose-section is being secured on said tapered projection, as set forth.

5. A hose-coupling having at one end a tailpiece, a coupling-nut loose thereon having a female thread, lugs projecting laterally from said nut, and lugs extending from the end of the coupling, said nut having openings designed to accommodate said latter lugs, as and for the purpose set forth.

In testimony whereof I have signed this specification in the presence of two subscribing witnesses.

FRANCIS STICKER.

Witnesses:
E. A. PERPALL,
GRAFTON L. McGILL.